United States Patent
Roychoudhury (10) Patent No.: US 9,636,888 B2
(45) Date of Patent: May 2, 2017

(54) INJECTION MOLDING OF HOLLOW ARTICLES

(71) Applicant: FORD GLOBAL TECHNOLOGIES, LLC, Dearborn, MI (US)

(72) Inventor: Raj S. Roychoudhury, Bloomfield Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 172 days.

(21) Appl. No.: 14/613,407

(22) Filed: Feb. 4, 2015

(65) Prior Publication Data

US 2016/0221295 A1   Aug. 4, 2016

(51) Int. Cl.
| | |
|---|---|
| B29C 45/16 | (2006.01) |
| B32B 3/28 | (2006.01) |
| B29L 31/30 | (2006.01) |
| B29L 22/02 | (2006.01) |

(52) U.S. Cl.
CPC ............ *B32B 3/28* (2013.01); *B29C 45/1657* (2013.01); *B29C 45/1671* (2013.01); *B29C 2045/1668* (2013.01); *B29L 2022/027* (2013.01); *B29L 2031/3041* (2013.01); *B32B 2605/003* (2013.01)

(58) Field of Classification Search
CPC .... B29C 2045/0063; B29C 2045/2683; B29C 45/12
See application file for complete search history.

(56) References Cited

U.S. PATENT DOCUMENTS

| | | | |
|---|---|---|---|
| 7,458,604 | B2 | 12/2008 | Hier et al. |
| 8,205,909 | B2 | 6/2012 | Kalisz |
| 8,388,020 | B2 | 3/2013 | Ciplijauskas et al. |
| 8,414,024 | B1 | 4/2013 | Kalisz et al. |
| 8,474,868 | B2 | 7/2013 | Kalisz et al. |
| 8,491,008 | B2 | 7/2013 | Roychoudhury et al. |
| 8,720,948 | B2 | 5/2014 | Raines et al. |
| 2002/0002782 | A1* | 1/2002 | Voss ................... B29C 45/0062 38/77.8 |
| 2005/0052010 | A1 | 3/2005 | Best et al. |
| 2005/0098996 | A1 | 5/2005 | Enders |
| 2006/0066088 | A1 | 3/2006 | Hier et al. |
| 2007/0108747 | A1 | 5/2007 | Roychoudhury et al. |
| 2008/0150268 | A1 | 6/2008 | Best et al. |
| 2009/0152848 | A1 | 6/2009 | Sadr et al. |
| 2009/0250915 | A1 | 10/2009 | Best et al. |
| 2009/0263533 | A1 | 10/2009 | Nishida |
| 2011/0109064 | A1 | 5/2011 | Best et al. |
| 2011/0115201 | A1 | 5/2011 | Best et al. |
| 2011/0133435 | A1 | 6/2011 | Sadr et al. |
| 2011/0198827 | A1 | 8/2011 | Roychoudhury |

(Continued)

FOREIGN PATENT DOCUMENTS

DE          202014105283         * 12/2014

*Primary Examiner* — Jill Heitbrink
(74) *Attorney, Agent, or Firm* — Vichit Chea; MacMillan, Sobanski & Todd, LLC (57) ABSTRACT

Described are joint designs, tooling, and molding methods for a hollow object, such as an automobile bolster. The methods and structures provide a process and system that facilitates mold alignment, part alignment, material strength, design adaptability, efficient processing, reduced labor, increased production rates, reduced energy consumption per part, aesthetically pleasing surfaces, and reduces or eliminates the need for welding.

9 Claims, 7 Drawing Sheets

(56) References Cited

U.S. PATENT DOCUMENTS

| | | |
|---|---|---|
| 2011/0272926 A1* | 11/2011 | Roychoudhury ..... B60R 21/235 |
| | | 280/728.2 |
| 2012/0080871 A1 | 4/2012 | Roychoudhury et al. |
| 2012/0112439 A1 | 5/2012 | Roychoudhury |
| 2012/0261941 A1 | 10/2012 | Sadr et al. |
| 2013/0106086 A1 | 5/2013 | Kang et al. |
| 2013/0328291 A1 | 12/2013 | Roychoudhury |
| 2013/0341825 A1 | 12/2013 | Watanabe et al. |
| 2013/0341893 A1 | 12/2013 | Sadr et al. |
| 2013/0341897 A1 | 12/2013 | Roychoudhury |
| 2014/0346759 A1 | 11/2014 | Sadr et al. |

\* cited by examiner

INJECTION MOLDING OF HOLLOW ARTICLES

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to injection molding methods, designs, and structures, and, more specifically, to over-molding methods for producing injection molded hollow articles. Exemplary uses of molded articles include inflatable bolsters to mitigate injury in a vehicular collision. Described are bolster designs and methods for molding and tooling in bolster production.

An active bolster is a vehicle occupant protection device with a gas-inflatable bladder to absorb impacts and reduce injury to occupants during a crash. Active bolsters deploy in a vehicle crash to cushion the impact force of an occupant against an interior panel of the vehicle. As opposed to air bag cushions, that emerge from behind various openings upon inflation, active bolsters use the interior trim surface itself to expand upon sensing a crash event to absorb an occupant impact and dissipate energy by venting an inflation gas.

The bolster has an expandable hollow chamber typically formed by injection molding a vehicle interior-facing front trim wall section and a rear bladder section. The front and rear sections may be attached around the periphery to join the two sections forming the chamber. This manufacturing process provides the advantages of injection molding which include: providing materials of higher strength and consistency than blow molding, producing parts with good fit and finish, and forming each section separately such that a different material and a different thickness of material may be used in making each section.

However, this manufacturing process also has drawbacks. The separate formation and subsequent alignment and joining of the parts increases the time and labor needed to manufacture the bolster. The weld seam between the two sections creates a weak point which increases the possibility of weld separation during inflation or increases the rejection rate of bolster units during production. The process of hot-plate welding generally involves forming the weld on a flat surface such that the direction of the inflation force is perpendicular to the weld which can lead to peeling apart and weld separation when the bolster inflates.

Various stresses during inflation can contribute to the possibility of weld separation at the attachment joint between separately molded structures. Due to the configuration of attachment for making the pleated bladder wall inflatable, a significant peel stress is experienced in some weld seam designs during expansion. A plastic joint generally exhibits a greater strength in shear than in peel. It would be desirable to take advantage of the greater shear strength in order to reduce the likelihood of a joint separation.

Therefore, there is a need for a bolster design and manufacturing process that provides the advantages of injection molding while reducing inefficiency and joint separation. Likewise, such a design and manufacturing process would be beneficial for other robust hollow articles, such as pressure vessels.

SUMMARY OF THE INVENTION

In one aspect of the invention, a method is provided for injection molding a hollow article by in-mold over-molding. An exemplary method comprises: providing a three-piece mold; injecting a first shot of a first molding material into a cavity between a first mold and a second mold to form a first part; injecting a second shot of a second molding material into a cavity between the second mold and a third mold to form a second part; repositioning at least one mold to align the first mold and the third mold, wherein the first part is retained in the first mold and the second part is retained in the third mold; injecting a third shot of a third molding material into a cavity between the first part and the second part, wherein the third molding material bonds the first part to the second part thereby forming the hollow article.

A further feature in embodiments of the invention is constraining flow of the third shot by a compression area formed by fitting the first part to the second part.

Another aspect of the invention is to provide tooling for in-mold over-molding.

One embodiment provides for a three-part mold with in-mold over-molding without removing the parts from the formation mold prior to bonding the parts.

One embodiment of a three-part mold design allows for synchronous processing and transfer of a center mold between two injection molding machines.

Another embodiment provides for a four-part mold with in-mold over-molding without removing the parts from at least one of the formation molds prior to bonding the parts.

Another embodiment provides for at least one separate bonding mold with transfer of one or more parts to the bonding mold. Likewise molds, rather than parts, may be transferred between injection molding machines.

Another aspect of the invention is to provide a hollow object that is cost effective to manufacture and aesthetically pleasing. In some embodiments the hollow article is a vehicle bolster.

In embodiments of the invention, the joint between the parts of the hollow object is strong and resistant to separation.

In accordance with the foregoing aspects of the invention, exemplary methods, systems, designs, and tools are provided.

DETAILED DESCRIPTION OF PREFERRED EMBODIMENTS

Described herein are structures and methods of manufacturing a hollow article using injection molding with overmolding to produce a robust structure. Exemplary embodiments include expandable hollow articles suitable for use in active bolster safety systems.

An active bolster structure typically includes an outer wall or trim panel, facing a vehicle occupant, attached to an inner wall, flexible sheet, or bladder along a sealed periphery. One or both of the walls is deformable in order to provide an inflatable cushion. The inner bladder wall may have a pleated (i.e., accordion-like) region that unfolds during inflation.

Bolster designs include: U.S. Pat. No. 8,205,909, issued Jun. 26, 2012, incorporated herein by reference, which discloses an active knee bolster integrated into a glove box door that is light weight and visually attractive. U.S. Pat. No. 8,474,868, issued Jul. 2, 2013, also incorporated herein by reference, discloses another structure wherein an active bolster includes an outer wall or trim panel that faces a vehicle occupant attached to an inner wall or panel along a sealed periphery.

To aid in protecting the legs of a vehicle occupant, an active knee bolster system may be located adjacent to the legroom area of a vehicle. The system may have a base panel component which forms the support structure or foundation for the bolster. The base may be part of a glove box door attached to the vehicle by hinging from a storage cavity or glove box. Alternatively, an active bolster can be mounted to another support structure such as, for example, an instrument panel support below a steering column. Such locations interface to the knees of an individual riding in a corresponding seating position within a vehicle. The bolster may also be placed for protecting other body areas, such as a bolster mounted on a passenger door for torso protection for interior impact. An inflation gas source, or inflator, may be mechanically or electronically controlled for activating during a crash to release gas to inflate the bolster.

Injection molding is used in bolster production. In existing processes, parts of the bolster are separately molded, independently, using different tools specific to each piece, component, or section. Each piece is formed non-synchronously with other parts of the bolster and assembled after the injection molding process is complete.

In contrast, embodiments of the invention describe injection molding with in-mold assembly of the bladder wall and trim wall of a bolster. Embodiments describe injection of a co-molding material to form a bond between the parts. Embodiments describe a pleat and mold configuration to constrain co-molded material flow. Embodiments describe a three-part mold, a three-part mold with a dual-machine synchronous production line, a sliding die mold system, and a four-part mold. Embodiments also describe side-by-side molding machines using a shared center mold tool. Embodiments describe forming a mechanical lock between parts using part transfer between molds.

Figure 1:
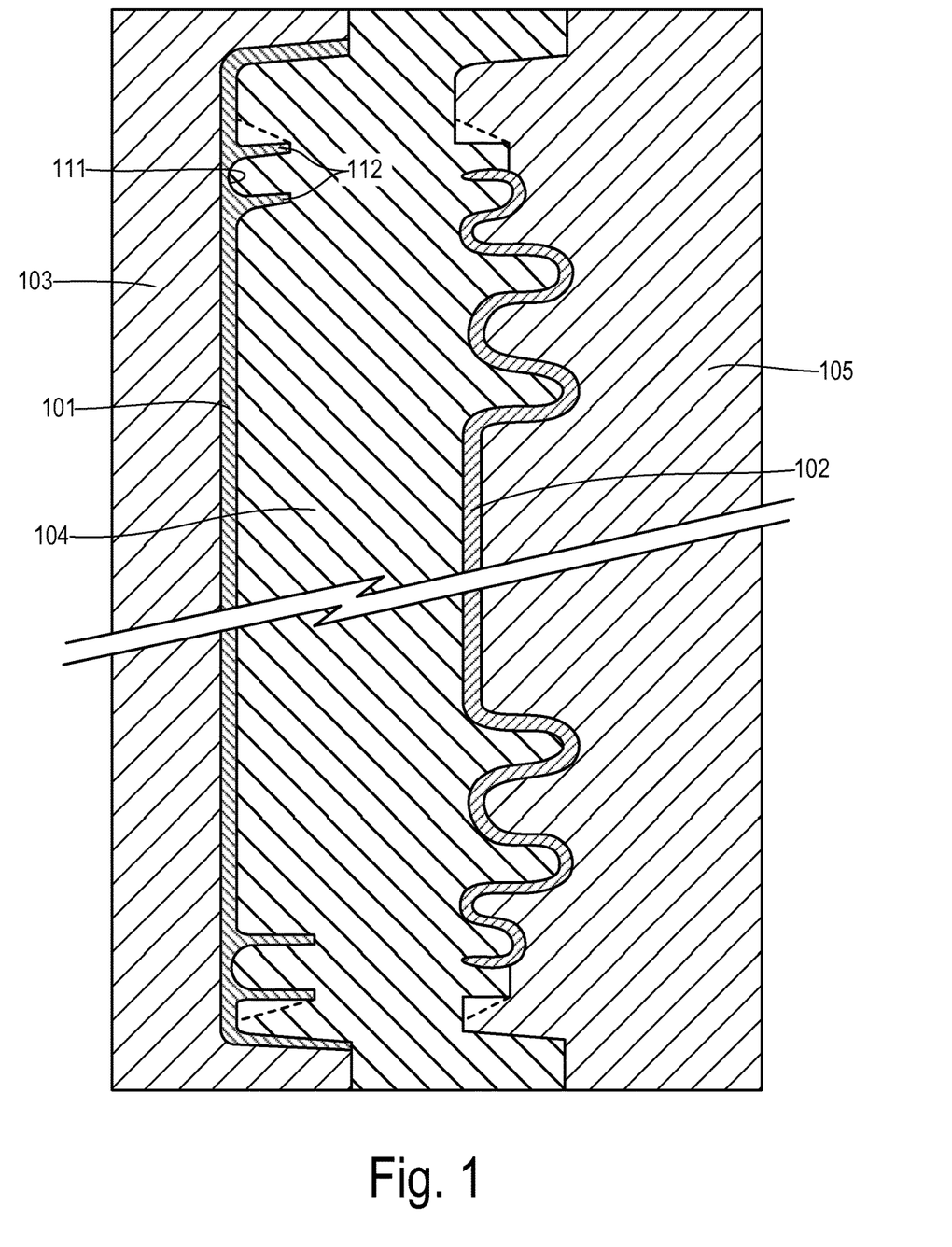
FIG. 1 is a cross section view of a bolster mold having three mold sections.
Figure 2:
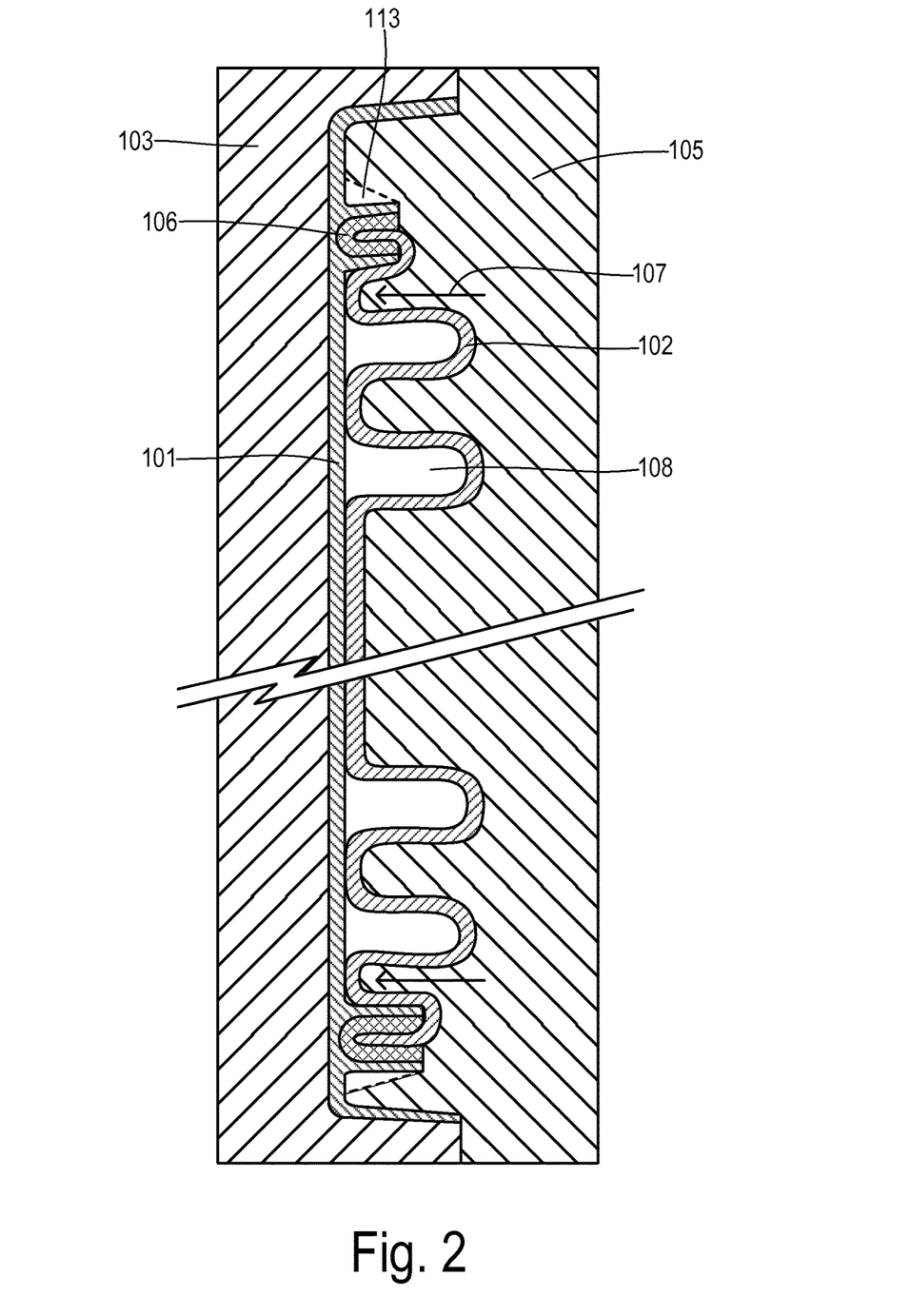
FIG. 2 is a cross section view of the bolster mold of FIG. 1 with the center mold section removed and the outer mold sections aligned.
Figure 3:
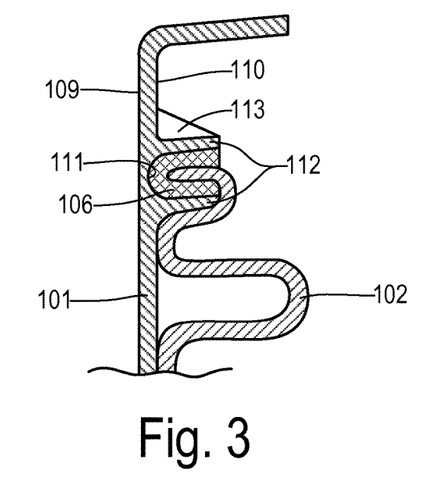
FIG. 3 is a cross section detail view of a formed bolster.

Turning now to the figures, FIGS. 1-3 show a three-piece tool with in-mold over-mold bonding. Multiple parts are formed and bonded together without removing the parts from a mold, tool, or die, in which a part was formed. Two non-symmetric halves or sides of an assembly are formed simultaneously with a first shot and a second shot of injection molding material, using three molds or tools and then joined with a third shot of injection molding material after removal of the center mold.

FIG. 1 shows a cross section of molds for a knee bolster assembly. A passenger-facing trim panel 101 is formed between a first mold 103 and a second mold 104. An expandable pleated bladder sheet 102 is formed between the second mold 104 and a third mold 105. The second mold 104 is removed and FIG. 2 shows the trim panel 101 in the first mold 103 adjacent the bladder sheet 102 in the third mold 105. The trim panel 101 is positioned adjacent to the bladder sheet 102 with a bonding material 106 joining the two sections. The materials forming the bond 106, the trim panel 101, and the bladder sheet 102 may be the same injection molding material or may be formed from different materials.

As shown in FIG. 2, the third mold 105 has a compression area 107 which prevents the injected bonding material from flowing past the first pleat and into a central cavity 108 when the first 103 and third 105 molds are in alignment for forming the bond 106.

The in-mold overmolding between the bladder sheet 102 and trim panel 101 aids in alignment, thereby enhancing dimensional accuracy for good quality fit and finish. Applying the overmold joining material while the bladder sheet 102 and trim panel 101 remain in at least one mold from the forming step also enhances bonding because residual heat in a part remaining in a mold facilitates bonding for most injection molding materials. The process also reduces energy consumption because the molds do not require complete cooling before the bonding step and the heating and cooling cycle uses a large portion of the energy in the injection molding process. Reducing the number of mold transfers also minimizes visual defects from the use of mold ejector pins.

FIG. 3 shows a cross-section detail of a section of a formed knee bolster assembly 100 in the undeployed position. It shows the trim panel 101, bond 106, and bladder sheet 102. A central area between the trim panel 101 and bladder sheet 102 forms an expansion cavity 108. The bladder sheet 102, in the undeployed position has pleats, or accordion-like folds, which unfold to expand to the deployed position when the cavity 108 is filled with an inflation gas. The trim panel 101 has an exterior surface 109 facing the vehicle cabin space and an interior surface 110 facing the bladder sheet 102.

The interior surface 110 shows a furrow 111 and ridges 112 near the periphery of the interior surface 110. The bladder sheet 102 edge inserts into the furrow, channel, or groove 111 between the ridges 112. The bond 106 adheres the bladder edge to the trim panel 101 at the furrow 111 between the ridges 112. One benefit of the bond 106 location at the groove 111 between the ridges 112 is that the force of bladder inflation exerts sheer force, rather than peel force, at the juncture between the bladder sheet 102 and trim panel 101. In some embodiments, the bond 106, loaded in sheer, is stronger than the tensile strength of the bladder sheet 102.

In addition to enhanced strength, another benefit of the bond location and configuration in a substantially perpendicular groove, sealed near the periphery and circumference of the panel, is the greater area available for the inflation cavity 108, as compared with bolsters having a bladder welded flat against an interior side of a trim wall. Because the injection-molded joint can be narrower than a welded joint, a larger bag or inflation cavity may be provided with a molded bolster design as compared to a standard welded bolster design in an equivalent size space.

Further advantages of an injection-molded design over a welded bolster design include: enhanced dimensional accuracy in joining parts leading to improved fit and finish; savings in cost in space, equipment, and labor by eliminating a weld station from the process; and reduced waste and lower part rejection rates due to the elimination of weld variation.

The ridges 112 may be reinforced with gussets 113. Gussets 113, or fin-like supports, provide rigidity, strength, and support, without undue bulk or thickness in the trim panel 101. Sink marks in the trim panel outer surface 109 are avoided by using gussets 113 for support, enabling the ridge area to have enhanced strength while maintaining a thickness that is proportionate to the average wall thickness.

Dimensions of a bolster may be adjusted and designed with regard to the materials selected and desired functional parameters. In vehicle cabin design, aesthetically pleasing materials, often referred to as class A materials, are generally selected for surfaces visible in the cabin. In contrast, materials selected primarily for function and not designed for visual appeal, often referred to as class B materials, may be selected for hidden surfaces. For example, the trim panel 101 may be formed using a class A materials, while the bladder sheet 102 may be formed using class B materials.

One or more of the molds may be provided with multiple injection gates. The use of multiple gates in a single mold provides separate inlets for injection of molding material and injection of bonding material. It may also provide multiple inlets for a single material. In some embodiments the injection gates are evenly spaced along the joint line. In some embodiments, the gates are substantially evenly spaced at intervals. In some embodiments the gates are configured to direct the injected material flow. In some embodiments the gates are configured to direct injected bonding material to flow in substantially one direction around the joint.

The hollow object may be formed using die slide processing. In die slide processing the segments of the hollow object are formed in a first set of molds and those molds are then moved into alignment within the machine for joining the segments.

Figure 4:
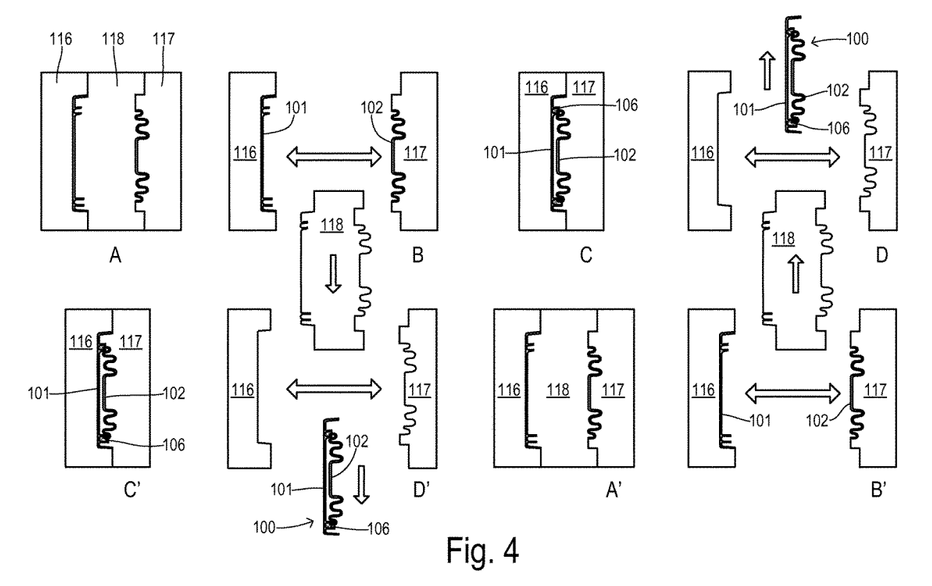
FIG. 4 is a depiction of a sequence for forming a bolster using a two-machine process with a shared center mold.

FIG. 4 is a depiction of a sequence for forming a bolster using a two-machine process with a shared center tool. The steps progress in offset parallel synchronous operation. Each machine or injection station progresses through injection molding steps in a cycle. Each machine has a trim panel tool 116 and a bladder tool 117. There is also a center tool 118 that is moved between the two machines. The center tool 118 may be moved manually or, more preferably, by an automated process.

As shown in FIG. 4, the steps are: A) forming the trim panel 101 and bladder sheet 102, B) removing the center mold 118, C) joining the trim panel 101 and bladder sheet 102 at the bond 106, and D) ejecting the formed bolster assembly 100, then repeating. The steps in the second machine are staggered in relation to the first machine but proceed in the same order. The center mold 118 is used in the first machine when it is not in use by the second machine. Thus, while the first machine progresses cyclically through A to B to C to D and back to A, the second machine progresses cyclically through C' to D' to A' to B' and back to C'. The two machines operate in synchronized cycles.

Figure 5:
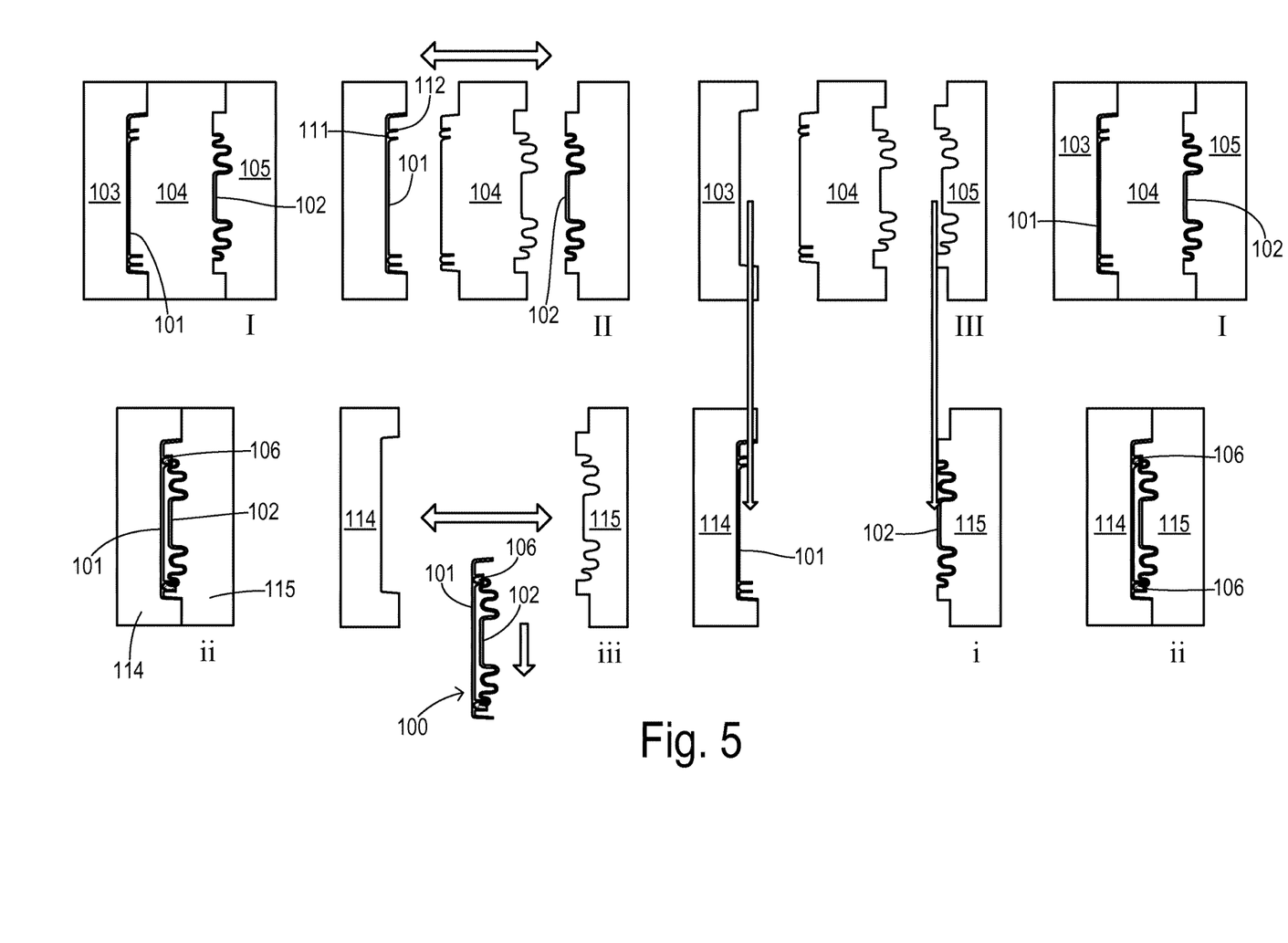
FIG. 5 is a depiction of a sequence for forming a bolster using a two-machine process with part transfer.

FIG. 5 shows a two machine simultaneous process with part transfer. The steps in the first machine are: I) forming the trim panel 101 and bladder sheet 102, II) separating the molds, III) moving the trim panel 101 and bladder sheet 102 to the second machine, and repeating. The steps in the second machine are i) placing the trim panel 101 and bladder sheet 102 into a first joining mold 114 and a second joining mold 115, ii) aligning the first joining mold 114 and a second joining mold 115 and injecting bonding material to form the bond 106 joining the trim panel 101 and bladder sheet 102, and iii) separating the first joining mold 114 and a second joining mold 115 and ejecting the formed bolster assembly 100, then repeating. The steps in the second machine are staggered in relation to the first machine but proceed in the same order.

The result of the process shown in FIG. 5 can also be achieved by separately and non-synchronously molding the trim panel 101 and/or bladder sheet 102. Using a part transfer method, the trim panel 101 and bladder sheet 102 may each be molded separately, each in a two-part mold. Subsequently, the formed trim panel 101 and bladder sheet 102 parts are placed into a first joining mold 114 and a second joining mold 115 and bonding material is injected to form the bond 106.

Figure 6:
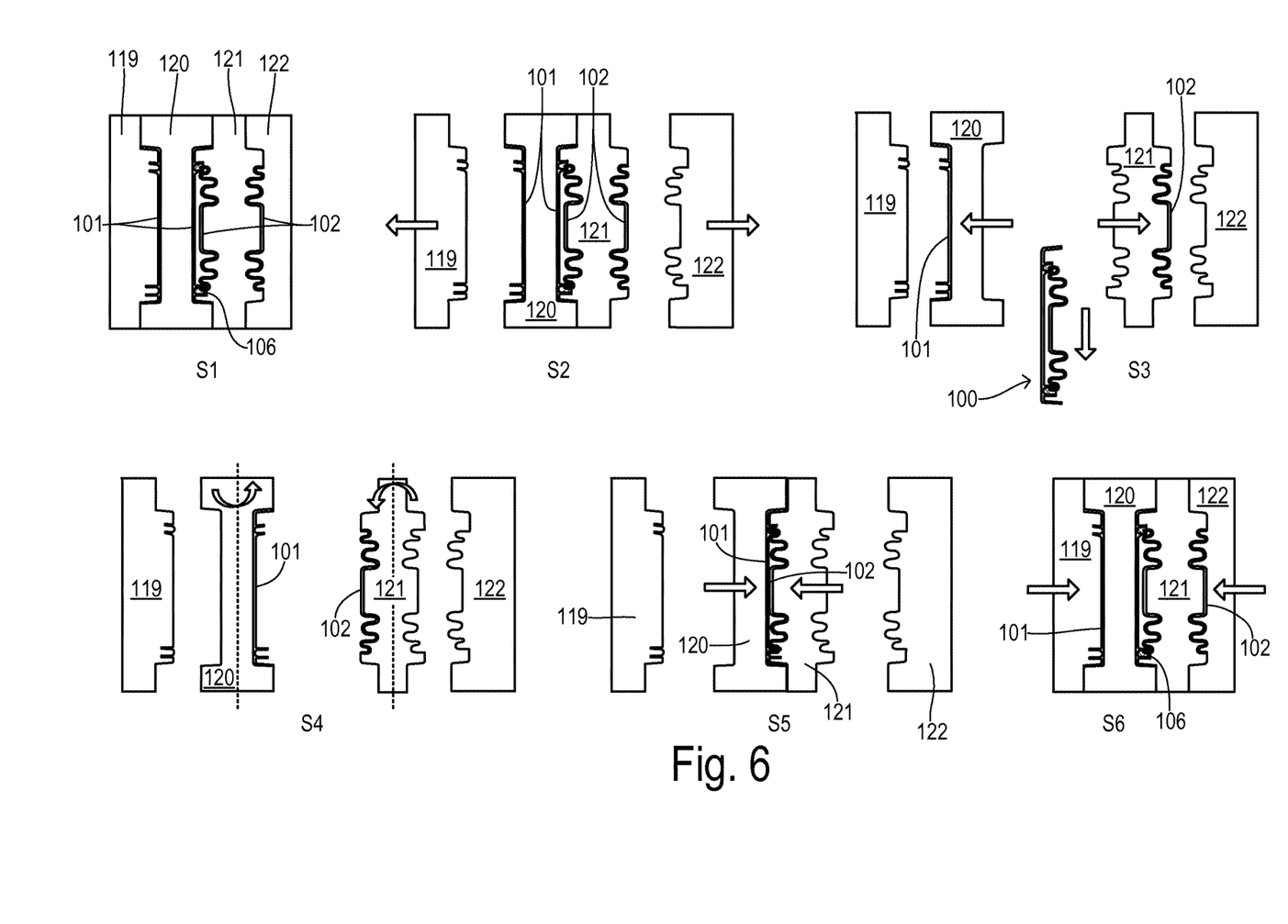
FIG. 6 is a depiction of a sequence for forming a bolster using a four-piece mold having two rotating center molds.

FIG. 6 is a depiction of a sequence for forming a bolster using a four-piece mold having two rotating center molds. As shown in FIG. 6, a four-piece tool with two rotating center tools may be configured to produce a bolster assembly 100. The first outer mold is a male trim wall tool 119. The first center tool is a female trim wall tool 120. The male and female trim wall tools form the mold for a trim panel 101. The second outer mold is a male bladder wall tool 122. The second center tool is a female bladder wall tool 121. The male and female bladder wall tools form the mold for a bladder sheet 102. By rotating, the first and second center tools position the trim panel 101 and bladder sheet 102 for forming a joint bond 106 between the two halves.

An exemplary cyclical sequence for forming a bolster bladder and trim assembly using a four-piece tool is as follows. Step 1) S1 The mold is fully closed. A trim panel 101 and bladder sheet 102 are joined to form a bond 106 between the center tools, the female trim wall tool 120 and the female bladder wall tool 121. A trim panel 101 is formed between the center female trim wall tool 120 and the male trim wall tool 119 on the first outer mold. A bladder sheet 102 is formed between the center female bladder wall tool 121 and the male bladder wall tool 122 on the second outer mold. Step 2) S2 The outer molds open. The formed bladder sheet 102 and trim panel 101 remain in their respective female center molds. Step 3) S3 The center molds separate. The joined bladder and trim bolster assembly is ejected from the central cavity. Step 4) S4 The center molds rotate. The formed bladder sheet 102 and trim panel 101 are positioned opposite each other in their respective center tools. Step 5) S5 The center tools converge, closing the central cavity and positioning the bladder sheet 102 and trim panel 101 for bonding. Step 6) S6 The cycle repeats. The center tools are rotated relative to the positions a few steps earlier, however, because of their shape the cycle can repeat from the beginning and step 6 S6 is equivalent to step 1 S1.

In this overlapping, cyclical production process the shape of each center tool is designed to mate with a mold in both a starting and rotated position. In the embodiment shown, each center tool has a first side and a second side and the tool is symmetrical between the first side and the second side.

This production process is advantageous because one trim and bladder bolster assembly can be joined while simultaneously another trim panel 101 and bladder sheet 102 is formed. This overlapping production increases molding speed and lowers processing cost. Another benefit is that the bolster parts remain in the mold and in the machine, thereby aiding alignment between the parts at the bonding step. The process may reduce processing time because the parts do not require full cooling and removal from the mold before bonding. The injection molding machine may be adapted to use different materials for each of the trim panel 101, the bladder sheet 102, and the joint bond.

Figure 7:
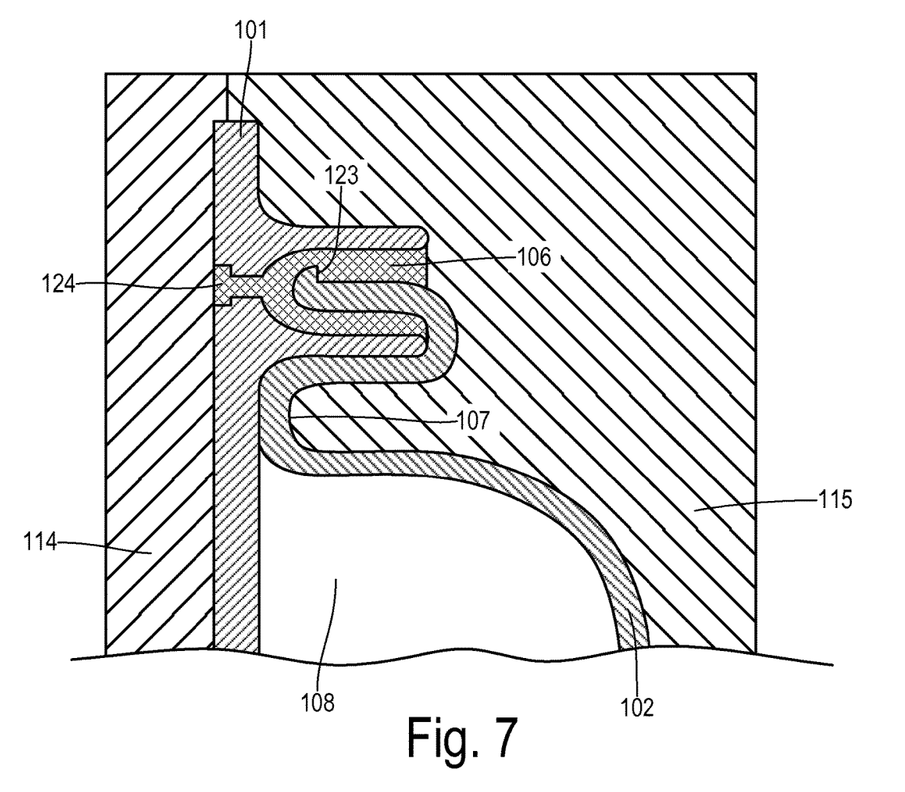
FIG. 7 is a cross-section detail view of a bolster joint with trim panel and bladder parts removed from a form mold to a joining mold for bonding.

FIG. 7 is a cross-section detail view of a bolster joint with panel and bladder parts removed from a form mold to a joining mold for bonding. In designing parts for fabrication in an injection molding process, it is important to ensure the part can be formed without die lock. Die lock is when a configuration precludes the mold from sliding open without damage to the molded part or to the mold. Various methods may be used to make shapes that would cause die lock if formed in a standard one-step mold process. The methods include, for example, multistep molding and molds with parts that move apart in more than one plane. FIG. 7 shows a joint design for parts moved to second mold for a bonding step with the parts in the second mold. This process provides a method by which the bonding material forms an overhang 123 of the bladder wall segment. Also shown is a segment of the trim panel 101 where the bond 106 extends and widens through the trim panel 101 to form a mechanically locked juncture 124. Mechanical locking can provide additional robustness and an additional mechanism, beyond material bonding, to prevent joint separation.

A gate or sprue for injecting the bonding material can be provided in either the first joining mold 114 or the second joining mold 115. Multiple gates may be provided in a mold for the injection of one or more materials. The compression area 107 prevents extrusion of the bond 106 past the first pleat and into the expansion cavity 108. Unsightly areas on the cabin-facing surfaces of the trim panel 101, such as a gate mark at the location of the sprue or the locking juncture 124, may be remedied by upholstery or surface treatment.

Figure 8:
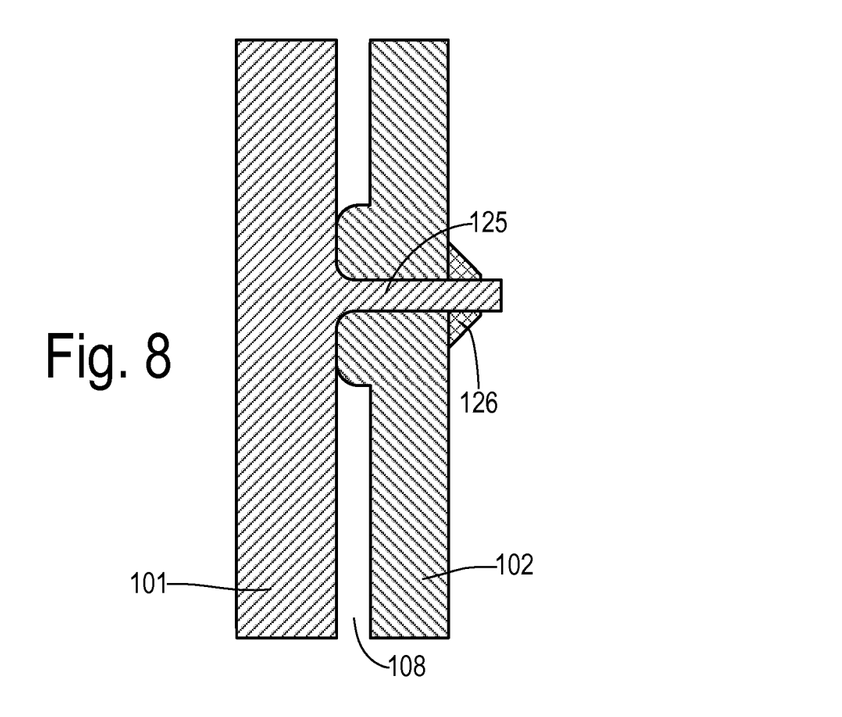
FIG. 8 is a cross-section detail view of a break-away tab in a bolster assembly.

As shown in FIG. 8, the trim piece 101 may further include one or more heat staked breakaway tabs 125. These tabs 125 may protrude like posts from the trim piece 101, through the expansion cavity 108 and to, or through, the bladder sheet 102. The tabs 125 detachably affix to the bladder sheet 102 or to a mounting structure (not shown). The tabs 125 may be affixed by overmolding bonding material at the juncture of the tab to the bladder sheet 102 to form an anchor 126 when injecting the bonding material. During normal use, the tabs would function to enhance fit and finish, reduce vibration, stabilize the trim piece, and/or reduce 'hollow' sounds when knocking against the trim panel. During an inflation event, the anchor 126 or the tabs 125 would rupture or detach. In some embodiments, each tab 125 would detach from the bladder sheet 102 at the anchor 126 due to inflation pressure.

Figure 9:
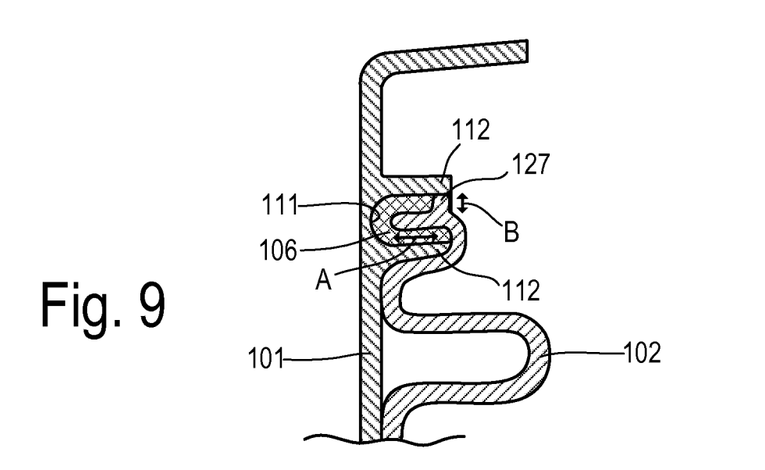
FIG. 9 is a cross section detail view of a formed bolster showing a flange.

As shown in FIG. 9, the bladder sheet 102 can be molded with a flange 127. To increase joint strength between the trim panel 101 and the bladder sheet 102, the surface area of the bond 106 can be increased. The surface area can be increased by increasing dimensions in the direction shown by the A arrow, increasing the depth of the groove or furrow 111 and protrusion height of the ridges 112. By the addition of the flange 127, the surface area can also be increased in the direction indicated by the B arrow, outward from the center of the bladder sheet 102 or parallel to the face of the trim panel 101.

The flange 127 may be configured to overlap the outer ridge 112. The flange 127 may alternately be configured to overlap all, or only a part, of the bond 106 without overlapping the outer ridge 112. In addition to providing additional surface area, the flange enhances the resistance of the joint to forces in multiple directions by providing a bonding surface in both the A and B directions.

The inner bladder, joint bond, and outer trim wall of an active bolster may be comprised of molded plastics such as polyethylene, polyolefin, or PVC. Other materials that may be useful in active bolster production include, for example: acrylonitrile butadiene styrene (ABS), nylon, polybenzimidazole (PBI), polypropylene, polyurethane, and other materials known in the art.

In particular installations and embodiments, the injection molded assembly has additional structures which may be formed of polymers, fiber-reinforced composites, metal alloys, plastic, composites, resins, polyepoxides, or other materials. The assembly may be adapted by means known in the art, such as with the use of brackets, braces, frames, clamps, notches, positioning grooves, levers, washers, gaskets, positioning mechanisms, and the like. The assembly may be adapted with padding, reinforcement, vents, texturing, upholstery, and additional features.

The methods and systems have been described with reference to the production and design of safety bolsters. However the methods and systems are also useful in other hollow molded items, such as pressure vessels, washing fluid vessels, and fuel tanks.

The terms and expressions which have been employed are used as terms of description and not of limitation. Whenever a range is given in the specification, all intermediate ranges and subranges, as well as all individual values included in the ranges given are intended to be included in the disclosure. It should be understood that, although the present invention has been specifically disclosed by particular embodiments and examples, optional features, modification and variation of the concepts herein disclosed may be used by those skilled in the art, and such modifications and variations are considered to be within the scope of the invention as defined by the appended claims.

What is claimed is:

1. A method for injection molding a hollow article using an injection molding machine with a three-piece mold, comprising:

injecting a first shot of a first molding material into a cavity between a first mold and a second mold to form a first part;

injecting a second shot of a second molding material into a cavity between the second mold and a third mold to form a second part;

repositioning at least one mold to align the first mold and the third mold, wherein the first part is retained in the first mold and the second part is retained in the third mold;

injecting a third shot of a third molding material into a cavity between the first part and the second part, wherein the third molding material bonds the first part to the second part thereby forming the hollow article;

operating a second injection molding machine in offset synchronous operation with a first injection molding machine, wherein the second mold is used in both machines;

removing the second mold from the first machine after the first machine injects the second shot of the second molding material and before the first machine injects the third shot of the third molding material;

transferring the second mold from the first machine to the second machine; and returning the second mold from the second machine to the first machine after the second machine injects the second shot of the second molding material and before the second machine injects the third shot of the third molding material.

2. The method of claim 1, wherein the hollow article is a vehicle bolster assembly.

3. The method of claim 1, further comprising: constraining flow of the third shot by a compression area formed by fitting the first part to the second part.

4. The method of claim 1, wherein the second mold is non-symmetric.

5. The method of claim 1, wherein the hollow article comprises:
    an injection molded panel having a ridge and furrow adjacent the perimeter of the panel,
    an injection molded sheet having a bonding section at an outer periphery of the sheet, wherein the bonding section is within the furrow; and
    an injection molded bond between the sheet bonding section and panel furrow.

6. The method of claim 1, wherein the first molding material is the same as the second molding material.

7. The method of claim 1, wherein the first molding material is not the same as the second molding material.

8. The method of claim 1, further comprising: injecting the first molding material at the same time that the second molding material is injected.

9. A method for injection molding a hollow article in offset synchronous operation, comprising:

a) aligning a first injection station to a first configuration, wherein a center tool is between a first front tool and a first back tool, configured to form a first front part and a first back part;

b) aligning a second injection station to a second configuration, wherein a second front part in a second front tool and a second back part in a second back tool are aligned to bond the second front part to the second back part;

c) simultaneously injecting molding material at the first and second injection stations, whereby the first configuration forms the first front part and the first back part, and whereby the second configuration bonds a second front part and a second back part to produce the hollow article;

d) moving the center tool from the first injection station to the second injection station and removing the hollow article from the second injection station;

e) aligning the first injection station to the second configuration;

f) aligning the second injection station to the first configuration;

g) simultaneously injecting molding material at the first and second injection stations;

h) moving the center tool from the second injection station to the first injection station and removing the hollow article from the first injection station; and i) sequentially repeating steps a-h.

* * * * *